United States Patent

[11] 3,593,501

| [72] | Inventor | Antony D. Cameron<br>Aberdeen, England |
|---|---|---|
| [21] | Appl. No. | 886,462 |
| [22] | Filed | Dec. 19, 1969 |
| [45] | Patented | July 20, 1971 |
| [73] | Assignee | Aberdeen Engineering Design Limited<br>Aberdeen, England |
| [32] | Priority | May 3, 1967 |
| [33] | | Great Britain |
| [31] | | 20,435/67 |
| | | Continuation-in-part of application Ser. No.<br>725,868, May 1, 1968, now abandoned. |

[54] DEVICE FOR SEPARATING PARTICULATE MATERIAL FROM A MIXTURE OF PARTICULATE MATERIAL AND FLUID
2 Claims, 4 Drawing Figs.

[52] U.S. Cl. .................................................. 55/338,
55/457
[51] Int. Cl. ....................................................... B01d 45/12
[50] Field of Search ........................................... 55/338,
447, 458—460; 209/211, 144; 210/512

[56] References Cited
UNITED STATES PATENTS

| 2,732,032 | 1/1956 | Sandison ....................... | 55/457 |
| 3,267,649 | 8/1966 | Vicard ........................... | 55/338 |
| 3,396,511 | 8/1968 | Fracke et al. ................. | 55/338 |

FOREIGN PATENTS

| 958,182 | 5/1964 | Great Britain ................ | 55/447 |

Primary Examiner—Frank W. Lutter
Assistant Examiner—Bernard Nozick
Attorney—Mason, Fenwick & Lawrence ABSTRACT: A centrifugal dust-from-air separator in which an upright cylindrical casing has mutually opposed nozzles on each end which project into the casing through opposite end walls and are convergent towards the interior of the casing. A guide member extends along the axis of the casing and enters the mouth of the nozzles so that swirling air and dust mixture entering one nozzle induce a secondary recirculating airflow in the casing, dust moving into the secondary flow under centrifugal force and being deposited at the lower end of the casing and clean air leaving by way of the upper nozzles.

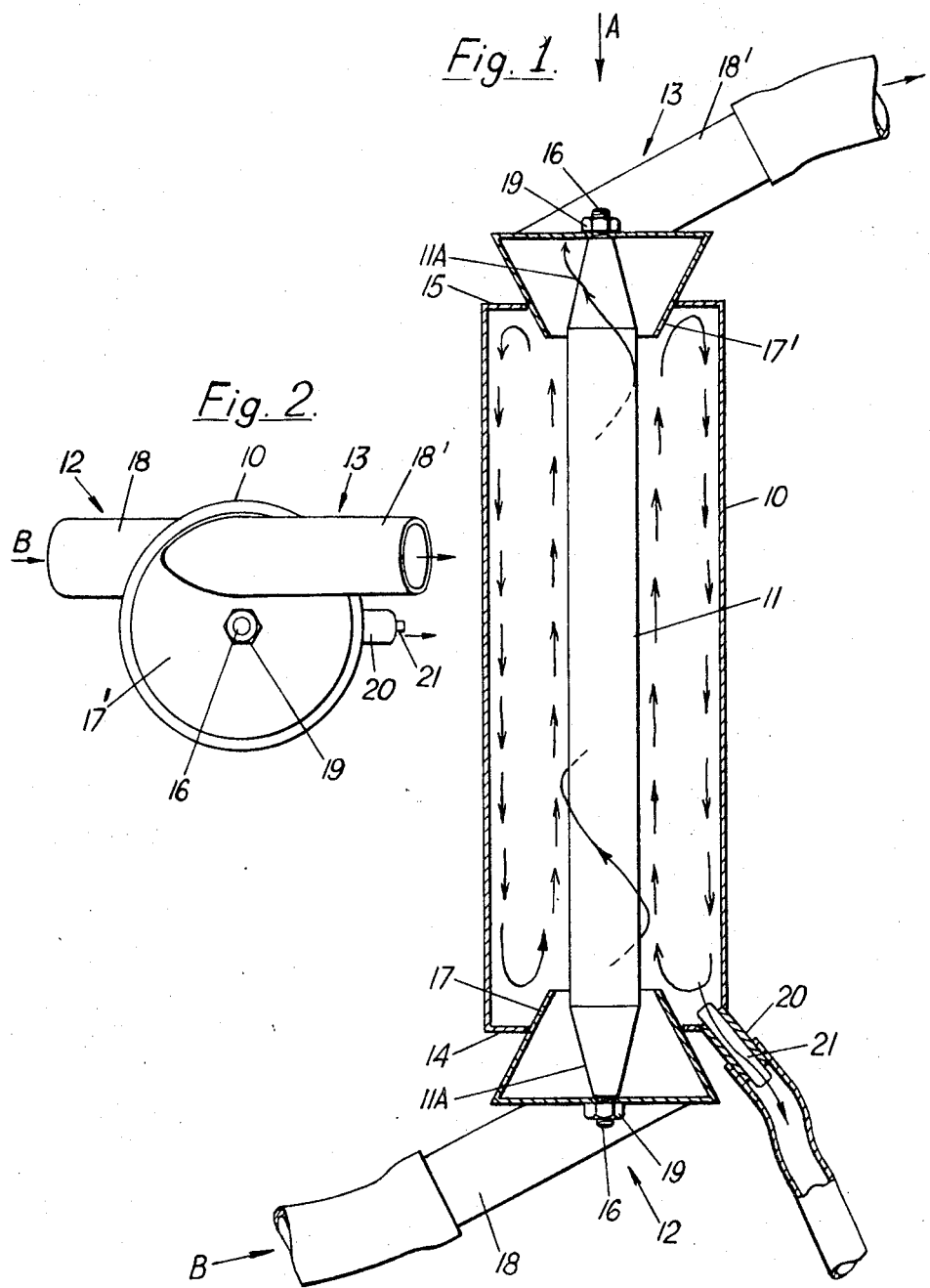

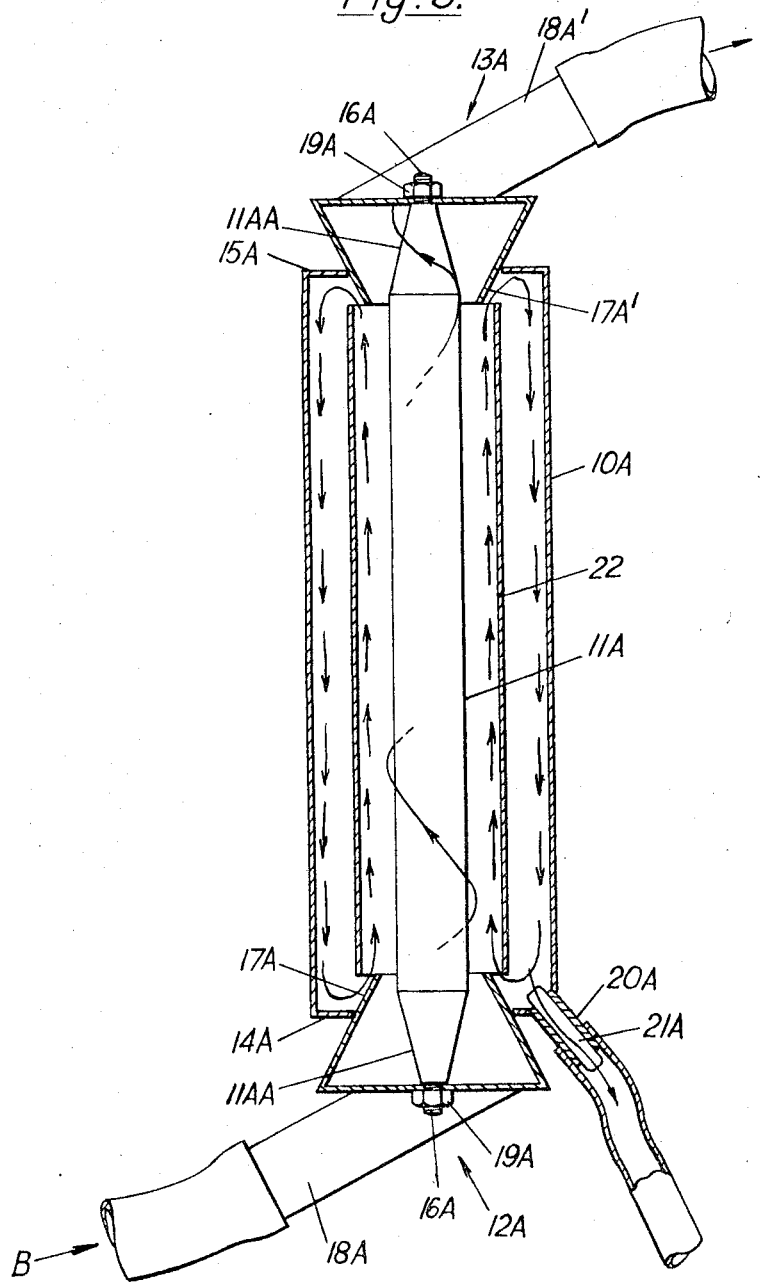

DEVICE FOR SEPARATING PARTICULATE MATERIAL FROM A MIXTURE OF PARTICULATE MATERIAL AND FLUID

This invention relates to a device for use in separating particulate material from a mixture of particulate material and a fluid, and especially, but not exclusively, to the separation of dust from a mixture of dust particles and air, and is a Continuation-in-Part of my copending Pat. application Ser. No. 725,868 filed May 1, 1968 now abandoned.

According to the present invention, there is provided a device for use in separating particulate material from a mixture of particulate material and fluid, said device comprising an upstanding cylindrical casing having opposed upper and lower end walls, tubular nozzles projecting one through each of said end walls having a nozzle mouth spaced inwardly from the adjacent end wall of the casing, at least one of said nozzles defining a convergent inlet to the casing, a guide member formed with a cylindrical external surface and extending on and along the longitudinal axis of the casing and entering the mouths of the nozzles peripherally spaced therefrom, said cylindrical external surface of said guide member defining a primary flow path between said nozzles, an oblique inlet conduit offset from the longitudinal axis of the casing and connected to a bottom end wall of the nozzle defining said convergent inlet for directing mixture, when flowing into the casing through the said one of the nozzles defining a convergent inlet to the casing, helically around said guide member and towards the other nozzle along said primary flow path, the mouths of the nozzles being smaller in diameter than the internal diameter of the casing and a relatively small dust outlet in the end wall of the casing in which said one of said nozzles defining said convergent inlet extend and being positioned adjacent the cylindrical casing whereby, in use, flow of fluid helically along said primary flow path induces a secondary flow of fluid which recirculates from one end of the casing to the other end of the casing between the primary flow and the casing, particulate material moving under centrifugal force from the primary flow to the secondary flow and being deposited at the lower end of the casing.

Embodiments of the present invention will now be described, by way of example, with reference to the drawings in which:

FIG. 1 is a sectional elevation of a device according to the present invention,

FIG. 2 is a view in the direction of arrow A in FIG. 1,

FIG. 3 is a sectional elevation similar to FIG. 1, but including a modification.

Figure 4:
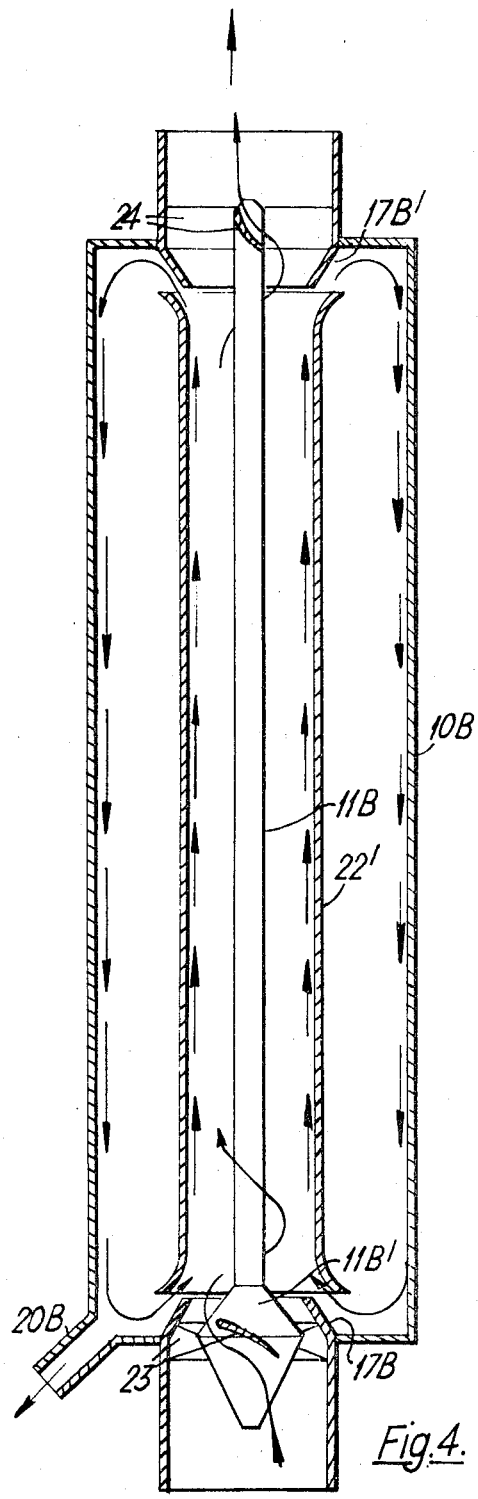
FIG. 4 is a sectional elevation similar to FIG. 1, but showing further modifications.

In FIGS. 1 and 2 of the drawings, a device for separating dust particles from a mixture of dust particles and air consists of an upstanding cylindrical casing 10, an elongate guide member in the form of a closed tube 11, a mixture inlet 12, and an air outlet 13.

More particularly, the casing 10 has closure members 14 and 15 one at each end of the casing, each closure member being a circular end wall having an aperture concentric with the casing 10. The tube 11 is concentric with the casing 10 and has tapered end portions 11A each of which terminates in a threaded rod or stud 16. The inlet 12 and the outlet 13 are identical in construction and consist of hollow frustoconical nozzles 17 and 17' the smaller diameter ends or mouths of which are open and project into the casing 10 through the end wall apertures. Pipes 18 and 18' are attached respectively to the bases of the nozzles 17 and 17' and these pipes 18 and 18' communicate with the interiors of the associated nozzles 17 and 17'. The pipes 18 and 18' are offset from the longitudinal axis of the device when viewed in plan and angled when viewed in elevation as can be seen in the drawings. The bases of the nozzles 17 and 17' each have a central hole for receiving one of the threaded studs 16, the tube 11 thus acting as a tie rod extending between the nozzles 17 and 17' and connected thereto by nuts 19.

The casing 10 is provided with a dust outlet in the form of a tube 20 which is in communication with the interior of the casing 10 and is located at one end thereof at the periphery of the closure member 14. The tube 20 is provided with an internal partition 21 which projects into the casing 10.

In use, a flow of air containing dust particles is introduced into the casing 10 through the inlet 12 in the direction of arrow B. Due to the offset position of the tube 18, the air/particle mixture entering the inlet nozzle 17 circulates in one direction around the adjacent end of the tube 11. The circulating mixture is then injected into the casing 10 through the open mouth of the inlet nozzle 17 and moves helically through the casing 10 around the tube 11 which serves to define a primary flow path between the nozzles and to guide the air component of the mixture towards the other end of the casing 10 and to fix the position of the vortex of the flow centrally within the casing 10. Dust particles are separated from the mixture as a result of centrifugal force and deposited at the lower end of the casing 10 by a recirculatory secondary airflow which is induced by the primary airflow, the air passing on and out of the casing 10 through the outlet 13 wherein circulating movement of the air is converted to a straight flow in the outlet tube 18'.

Where $D$ is the diameter of the exit of the nozzle 17' and $d$ is the diameter of that portion of the tube 11 which extends between the nozzle exits, the preferred relationship between the dimensions is given by:

$$d \text{ (minimum)} = \frac{1}{3} \times D$$

$$d \text{ (maximum)} = \frac{2}{3} \times D$$

The preferred minimum internal diameter of the casing 10 is equal to $\sqrt{3} \times D$.

The device above described is used with its longitudinal axis in an upright position so that trapped dust particles tend to fall to the lower end of the casing 10, where they find an outlet through the tube 20. The partition 21 induces a flow of air outwardly through the tube 20, which flow assists in the removal of the trapped dust particles from the casing 10.

A first preferred embodiment of the invention is shown in FIG. 3 in which the same reference numerals are used as in FIG. 1, but with the addition of the suffix 'A'. The device shown in FIG. 3 is constructed in the manner described in respect of FIG. 1 and, in addition, incorporates a further body or sleeve 22 which is arranged coaxial with the casing 10A and the tube 11A. The sleeve may be supported in the position shown in FIG. 3 by means of brackets (not shown) in the form of vanes adapted and arranged to present a minimum resistance to fluid flow within the device and serves to ensure a desired recirculation within the annular space formed by the external surface of the sleeve 22 and the internal surface of the casing 10A over the full length of the sleeve 22. The ends of the sleeve 22 are open and lie adjacent the mouths of the nozzles 17A and 17A'.

A second preferred embodiment of the invention is shown in FIG. 4 in which the same reference numerals are used as in FIG. 1, but with the addition of the suffix 'B'. The device shown in FIG. 4 incorporates a sleeve 22' similar to the sleeve 22 of FIG. 3, but having flared end portions. In FIG. 4, helical movement of the air/particle mixture is induced by means of angled vanes 23 in an alternative inlet nozzle 17B. The guide member 11B is generally of reduced diameter compared with the guide members 11 and 11A and includes a tapered portion 11B' adjacent the mouth of the inlet nozzle 17B, the maximum diameter of the guide member 11B within the inlet nozzle 17B being about two-thirds the inlet nozzle diameter. An alternative outlet nozzle 17B' incorporates vanes 24 for cancelling helical movement of outflowing air.

Using the symbols $D$ and $d$ for the dimensions discussed with reference to the FIG. 1 embodiment, and where l is the distance between the nozzle mouths, it has been found preferable to incorporate the sleeve 22 when l is greater than $\sqrt{2} \times D$. The preferred diameter of the sleeve is equal to $\sqrt{2} \times D$.

Whereas the device first above described (FIGS. 1 and 2) is used with its longitudinal axis upright, the preferred embodiments (FIGS. 3 and 4) are advantageous in that they may be used with their longitudinal axes inclined and, moreover, in that dust particles are collected at the lower end of the casing 10A or 10B regardless of whether the air outlet is at the upper or the lower end of the device.

The scope of the present invention is not limited to the above described embodiments, and further modifications may be made. The particle outlet tube 20, 20A may, for example, be dispensed with, dust particles being removed from time to time by removing one of the closure members. The outlet assembly need not be identical in construction with the inlet assembly.

The length of the guide member may be chosen in accordance with the size and/or weight of the particles to be separated from the fluid/particle mixture. Relatively lightweight or small particles would require a longer helical path and therefore a larger guide member than would relatively heavy or large particles. Moreover, if desired, the guide member length may be chosen so that only relatively heavy or large particles were separated out while relatively lightweight or small particles were retained in the mixture; for example in the case where particles of different materials were present.

A number of devices according to the present invention may be arranged in parallel in order to provide increased capacity. A device according to the present invention may include a built-in fan or impeller driven by a motor mounted on the device or on an adjacent fixture. The casing may be provided with a door for providing access to the interior of the casing for the purpose of maintenance, including the removal of sticky substances and routine cleaning, painting and inspection.

The embodiments described may be used in applications other than the separation of dust from a mixture of dust and air. For example, particulate chemicals may be separated from gases, or valuable particles may be recovered from an unwanted fluid medium. A device in accordance with the present invention may be used in separating particulate material and a liquid, provided that the particles are of a density greater than that of the liquid. Metal particles may, for example, be removed from a lubricant or liquid coolant.

I claim:

1. A device for use in separating particulate material from a mixture of particulate material and fluid, said device comprising an upstanding cylindrical casing having opposed upper and lower end walls, tubular nozzles projecting one through each of said end walls having a nozzle mouth spaced inwardly from the adjacent end wall of the casing, at least one of said nozzles defining a convergent inlet to the casing, a guide member formed with a cylindrical external surface and extending on and along the longitudinal axis of the casing and entering the mouths of the nozzles peripherally spaced therefrom, said cylindrical external surface of said guide member defining a primary flow path between said nozzles, an oblique inlet conduit offset from the longitudinal axis of the casing and connected to a bottom end wall of the nozzle defining said convergent inlet for directing mixture, when flowing into the casing through the said one of the nozzles defining a convergent inlet to the casing, helically around said guide member and towards the other nozzle along said primary flow path, the mouths of the nozzles being smaller in diameter than the internal diameter of the casing and relatively small dust outlet in the end wall of the casing in which said one of said nozzles defining said convergent inlet extend and being positioned adjacent the cylindrical casing whereby, in use, flow of fluid helically along said primary flow path induces a secondary flow of fluid which recirculates from one end of the casing to the other end of the casing between the primary flow and the casing, particulate material moving under centrifugal force from the primary flow to the secondary flow and being deposited at the lower end of the casing.

2. A device according to claim 1 including a cylindrical baffle sleeve positioned concentrically around the said guide member for guiding said secondary flow, the internal diameter of the sleeve being greater than the diameter of the nozzle mouths, the external diameter of the sleeve being less than the internal diameter of the casing, and the length of the sleeve being maximally equal to the distance between the nozzle mouths.